United States Patent [19]
Ahad

[11] Patent Number: 5,605,975
[45] Date of Patent: Feb. 25, 1997

[54] BRANCHED ENERGETIC AZIDO POLYMERS

[75] Inventor: Elie Ahad, Ste-Foy, Canada

[73] Assignee: Her Majesty the Queen in right of Canada, as represented by the Minister of National Defence, Ottawa, Canada

[21] Appl. No.: 519,763

[22] Filed: Aug. 28, 1995

Related U.S. Application Data

[63] Continuation of Ser. No. 130,129, Oct. 4, 1993, abandoned.

[51] Int. Cl.$^6$ ............................ C08G 65/32; C08G 65/24
[52] U.S. Cl. ............................ 525/403; 525/54.2; 525/58; 525/408
[58] Field of Search ............................ 525/403, 54.2, 525/58, 408

[56] References Cited

U.S. PATENT DOCUMENTS

| | | | |
|---|---|---|---|
| 3,310,504 | 3/1967 | Vandenberg. | |
| 4,268,450 | 5/1981 | Frankel et al. | 525/410 |
| 4,486,351 | 12/1984 | Earl | 525/410 |
| 4,882,395 | 11/1989 | Ahad | 525/407 |
| 5,130,381 | 7/1992 | Ahad | 525/403 |
| 5,164,521 | 11/1992 | Manzara | 552/11 |
| 5,191,034 | 3/1993 | Ahad | 525/403 |
| 5,214,110 | 5/1993 | Ahad | 525/409 |

FOREIGN PATENT DOCUMENTS

| | | |
|---|---|---|
| 0380750 | 8/1990 | European Pat. Off. . |
| 0485099 | 5/1992 | European Pat. Off. . |
| 0526381 | 2/1993 | European Pat. Off. . |
| 2633300 | 12/1989 | France . |
| 9217524 | 10/1992 | WIPO . |

*Primary Examiner*—David Buttner
*Attorney, Agent, or Firm*—Cushman Darby & Cushman IP Group of Pillsbury Madison & Sutro, LLP

[57] ABSTRACT

The invention disclosed relates to novel branched chain hydroxy terminated aliphatic azido polymers and copolymers, and to a single step process for their production. The properties of the materials are preferably adjusted through the incorporation of suitable polyols which can provide additional branching of the materials.

24 Claims, No Drawings

BRANCHED ENERGETIC AZIDO POLYMERS

This is a continuation of application Ser. No. 08/130,129, filed on Oct. 4, 1993, which was abandoned upon the filing hereof.

FIELD OF THE INVENTION

This invention relates to a novel process for making branched-chain aliphatic azido ether polymers and copolymers, and to the novel polymers and copolymers produced by the process.

DESCRIPTION OF THE RELATED ART

Solid high-energy compositions, such as propellants, explosives, gasifiers, or the like, typically comprise solid particulates such as fuel particulates and/or oxidizer particulates dispersed and immobilized throughout a binder matrix comprising an elastomeric polymer.

Binders previously used in composite solid propellant formulations have generally been non-energetic polymers such as polycaprolactones, polyethyleneglycols or polybutadienes. There is continuing interest in this field to develop suitable binders which are energetic, and which have satisfactory mechanical properties. Development of these improved energetic binders is of interest in this area in order to provide safer binders which can provide higher energy levels and/or increase the specific impulse in a propellant formulation.

A number of materials have been suggested as energetic binders, including for example, poly(glycidyl nitrate), described, for example in European Patent publication EP-0, 485,099-A1 published May 13, 1992, nitrocellulose, or poly(oxetanes). Further, alternative composite materials have been used which consist of non-energetic binders and energetic materials such as nitroglycerine, butanetriol trinitrate and the like. However, there remains a need to develop improved materials for these applications, and for improved processes for producing these materials.

A further group of energetic materials which are of interest in the present application, are glycidyl azide polymers (GAP) and in particular, branched-chain aliphatic azido ether polymers and copolymers. These materials are potentially useful as binders in energetic formulations, such as rocket and gun propellants, composite explosives and pyrotechnics.

Linear hydroxy-terminated aliphatic polyethers having azido alkyl substituents, e.g. GAP, and a process for producing GAP are described in U.S. Pat. No. 4,268,450, issued May 19, 1981. In this patent, epichlorohydrin (ECH), as a starting material, is polymerized to polyepichlorohydrin (PECH) using a catalyst, such as boron trifluoride ($BF_3$), in the presence of a dichloro compound such as dichloromethane. In a second reaction step, PECH is azidized using a molar excess of sodium azide in the presence of a polar organic solvent such as dimethyl formamide (DMF). A final purification step using methylene chloride and drying over magnesium sulfate is also described.

It is emphasized that the polymer made according to U.S. Pat. No. 4,268,450 is a linear product. This is apparent from the functionality of the polymer as determined from the defined structural formula, i.e. including two OH groups, one at each end, and confirmed by the single example wherein the functionality is given as two. In fact, according to the patented process, only linear polymers may be obtained.

The multi-step process of U.S. Pat. No. 4,268,450 can be avoided by purchasing commercial PECH and azidizing, as described in U.S. Pat. No. 4,486,351, issued Dec. 4, 1984. However, the polyethers obtained by this process have essentially the same molecular weight as the starting material. Moreover, the choice of commercially available PECH with specific molecular weights is limited and they are relatively expensive.

In another prior art process described in U.S. Pat. No. 3,310,504, issued Mar. 21, 1967, high molecular weight epichlorohydrin polymers and copolymers were found to undergo a cleavage reaction to form lower molecular weight polymers when reacted with an organometallic compound of an alkali metal in the presence of dimethylsulfoxide (as a solvent) at 65° C. The resulting linear polymers include both hydroxyl and carbonyl terminal groups. The carbonyl groups are further reduced to hydroxyl by further reaction with lithium aluminum hydride. Azidization of the resultant material was not described and accordingly, a third reaction step would be required to obtain GAP polymers and copolymers.

In Applicant's previous U.S. Pat. No. 4,882,395 issued Nov. 21, 1989, and U.S. Pat. No. 5,214,110 issued May 25, 1993, branched chain hydroxy-terminated aliphatic azido ether polymers and copolymers, and processes for making these materials, are described. The processes involve the reaction of a solid rubbery high molecular weight epichlorohydrin polymer (PECH) or an epichlorohydrin/alkylene oxide copolymer (PEEC) with an epoxide monomer such as epichlorohydrin (ECH) and an alkali metal azide (e.g. sodium azide) in a suitable organic solvent (e.g. dimethyl formamide) at elevated temperatures. These processes provide a single-step combined chain cleavage, azidation and polymerization which results in an almost entirely hydroxyl terminated branched polymer of relatively low molecular weight.

Further improvements to this process are described in Applicant's U.S. Pat. No. 5,130,381, issued Jul. 14, 1992, and U.S. Pat. No. 5,191,034, issued Mar. 2, 1993. In these patents branched hydroxy-terminated aliphatic azido polyethers and copolymers, and a single step process for their production, are also described. However, the production processes described comprise reacting a high molecular weight solid rubbery polyepichlorohydrin (PECH) homopolymer and/or an epichlorohydrin/alkylene oxide copolymer (PEEC) with an alkali metal azide in a suitable organic solvent in the presence of a suitable initiator and, optionally, a basic degradation catalyst. In these processes, the use of an epoxide monomer was eliminated, and the molecular weight of the final material was controlled by including in the reaction mixture, a basic degradation catalyst. The GAP material obtained was of a generalized structural formula I or II,

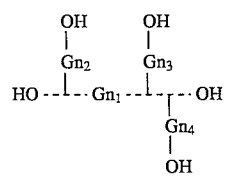

wherein

G is a GAP unit of formula

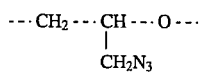

n is the total number of GAP units;

$$n = n_1 + n_2 + n_3 + \ldots + n_s = \sum_{i=1}^{s} n_i$$

$n_1$ is the number of GAP units in segment 1;
$n_2$ is the number of GAP units in segment 2;
$n_3$ is the number of GAP units in segment 3;
$n_s$ is the number of GAP units in segment s;
s is the total number of segments in the molecule;
$10 \leq n \leq 2000$,
and having a molecular weight of between 1000 to 200,000 depending the reaction co-reactants; and

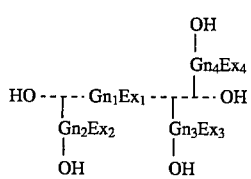

wherein
G is a GAP unit of formula

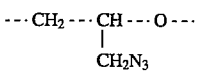

E is a (—O—R) unit, where R is $C_1$ to $C_4$ lower alkyl;
n is the total number of GAP units in the copolymer;

$$n = n_1 + n_2 + n_3 + \ldots + n_s = \sum_{i=1}^{s} n_i$$

x is the total number of E units in the copolymer;

$$x = x_1 + x_2 + x_3 + \ldots + x_s = \sum_{i=1}^{s} x_i$$

$n_1$ and $x_1$ are respectively the number of GAP and E units in segment 1;
$n_2$ and $x_2$ are respectively the number of GAP and E units in segment 2;
$n_3$ and $x_3$ are respectively the number of GAP and E units in segment 3;
$n_4$ and $x_4$ are respectively the number of GAP and E units in segment 4;
$n_s$ and $x_s$ are respectively the number of GAP and E units in segment s;
s is the total number of segments in the copolymer;
$7 \leq x \leq 1400$
$7 \leq n \leq 1400$, and a molecular weight of 1000 to 200,000, depending on co-reactants.

Suitable solvents described included dimethyl formamide (DMF), dimethyl acetamide (DMA), and dimethyl sulfoxide (DMSO), while the initiator used was typically a small amount of ethylene glycol (EG), glycerol or water. The basic degradation catalyst used was an organometallic compound of an alkali metal. Preferred degradation catalysts included lithium methoxide, sodium methoxide, sodium ethoxide, potassium tert-butoxide, sodium hydroxide and potassium hydroxide.

However, it is desirable to improve this process further by providing a better method of controlling molecular weight, hydroxyl functionality, and the like, in the final product.

SUMMARY OF THE INVENTION

Accordingly, the present invention provides a process for the preparation of branched chain hydroxy-terminated aliphatic azido ether polymers and copolymers comprising the single step of heating a reaction mixture consisting of:
i) a solid rubbery epichlorohydrin polymer (PECH) or an epichlorohydrin/alkylene oxide (PEEC) copolymer, or a mixture of PECH and PEEC, preferably having a molecular weight of $0.50 \times 10^6$ to $5.0 \times 10^6$; and
ii) an alkali metal azide,
in a suitable organic solvent, at a temperature of greater than 70° C.

Surprisingly, the reaction system described produces branched chain, hydroxyl-terminated, aliphatic azido ether polymers which have molecular weight lower than the PECH or PEEC starting materials, and have utility as GAP polymers or copolymers.

Preferably, however, in an alternative feature, the present invention also comprises a reaction system which comprises a polyol, other than ethylene glycol or glycerol. As a result of this feature, through the selection of suitable polyols, novel GAP polymers, or copolymers, can be produced. Further, the present process provides alternative methods of controlling the properties of GAP polymers and copolymers.

Accordingly, the present invention also provides, a process for the preparation of branched chain hydroxy-terminated aliphatic azido ether polymers and copolymers comprising the single step of reacting:
i) a solid rubbery epichlorohydrin polymer (PECH) or an epichlorohydrin/alkylene oxide (PEEC) copolymer, or a mixture of PECH and PEEC;
ii) an alkali metal azide; and
iii) a polyol, other than ethylene glycol or glycerol, which polyol becomes incorporated into the azido ether polymer or copolymer,
in a suitable organic solvent, at a temperature of greater than 70° C.

Since the present invention is directed to branched chain hydroxy-terminated polymers, the polymer will normally have a hydroxyl functionality of greater than 2. However, among other features, the present invention provides a ready means to control and adjust the hydroxyl functionality so that functionalities of, for example, greater than 10 or more can be achieved.

The polyol selected will not only affect the hydroxyl functionality, but will also affect the properties of the GAP polymer formed and can be used to adjust a number of the product properties including, for example, th energetic content of the GAP, the product viscosity, molecular weight, molecular weight distribution, distribution of hydroxyl functionality and hydroxyl type (i.e. primary and secondary alcohols). For example, a polyol having a hydroxyl functionality of greater than two provides branching points on the polymer chain, at a number of different locations. Thus, the degree of branching of the GAP can be adjusted and/or controlled by selection of suitable polyols.

The polyol may be any polyol which is suitable for the reaction conditions, but is preferably a diol, other than ethylene glycol, a triol, other than glycerol, a tetraol, a polyether or a polyester. More preferably, the polyol is hexanetriol, trimethylol propane, butanetriol, trimethylolethane, pentaerythritol, dipentaerythritol, or sucrose, or is polyethylene glycol, polypropylene glycol, polytetrahydrofuran, a glycidyl azide polymer, a polycaprolactone, a polyoxetane, a polyethyleneadipate, or a polyvinyl alcohol. The polyol may also comprise a mixture of these materials, or these materials in combination with water, ethylene glycol, or glycerol.

Preferably, the polyol is hydroxy-terminated, and preferably, the level of polyol is a weight ratio of polyol to PECH or PEEC of about 0.005 to 1.00, and more preferably between 0.010 and 0.50.

The reactions of the present invention are preferably conducted in the presence of a basic cleaving agent. Suitable cleaving agents include organometallic compounds of an alkali metal. Any organometallic compound of an alkali metal, i.e. lithium, sodium, potassium, rubidium or cesium, can be used. The organo moiety will preferably be a hydrocarbon group as, for example, an alkyl, aryl, alkenyl, alkynyl, cycloalkyl, cycloalkenyl, or aralkyl group or the like. Exemplary of the alkali metal organometallic compounds that can be used are methyllithium, ethyllithium, isopropyllithium, n-butyllithium, isobutyllithium, tert-butyllithium, amyl-lithium, decyllithium octadecyllithium, cyclohexyllithium, cyclhexenyllithium, phenyllithium, naphthyllithium, vinyllithium, lithium acetylide, methylsodium, ethylsodium, propylsodium, isopropylsodium, the butylsodiums, amylsodium, dodecylsodium, benzylsodium, isopropenylsodium, allylsodium, octadecenylsodium, butadientylsodium, isoprenylsodium, butylrubidium, butylcesium, methyl-, ethyl-, propyl- and butyl-potassium, allylpotassium, octylpotassium, phenylpotassium, cyclopentylpotassium, cyclohexenylpotassium, etc. Other types of cleaving agents, such as alkali metal alkoxides and phenoxides, for example, sodium or lithium methoxide, ethoxide, isopropoxide, or n- or t-butoxide, or sodium or lithium phenoxide and even alkali metal hydroxides such as sodium hydroxide can also be used to assist in producing the branch chained polymers of the present invention.

Of these materials, lithium methoxide, sodium methoxide, sodium ethoxide, potassium tert-butoxide, sodium hydroxide and potassium hydroxide are preferred.

The preferred weight ratio of cleaving agent, when used, to PECH or PEEC is between about 0.005 to about 0.25, and more preferably between 0.010 and 0.20.

The preferred solvents employed in the processes of the invention, should be able to dissolve the rubbery PECH and/or the PEEC, and also the azide used, in order to accomplish both the degradation and azidation reactions. Preferably, the PECH and/or PEEC utilized is fully dissolved in the solvent. It will be appreciated that the dissolution time of the PECH or PEEC material is dependent, inter alia, on the molecular weight of the starting material(s). High molecular weight starting materials will generally require longer dissolution times. The preferred solvents include polar organic solvents such as dimethylformamide (DMF), dimethyl acetamide (DMA), and dimethyl sulfoxide (DMSO), or mixtures thereof.

The preferred azides include potassium azide, or lithium azide, and most preferably, sodium azide. The azide is preferably added to the reaction mixture after dissolution of the PECH and/or PEEC in the solvent, and is preferably added to the mixture prior to the addition of the basic cleaving agent, when the cleaving agent is used.

Preferably, the reaction is conducted with a molar excess of azide material. Accordingly, in practice, the weight ratio of, for example, sodium azide to PECH or PEEC preferably ranges between about 0.55 and about 0.80. For PECH materials, the ratio of sodium azide to PECH is preferably about 0.80, while for PEEC, the preferred ratio of sodium azide to PEEC is about 0.55. Mixtures of PECH and PEEC will preferably have a sodium azide weight ratio which is adjusted, pro rata, between 0.55 and 0.80, based on the levels of PECH and PEEC. In general, these ratios, represent a slight excess, for example between a 5 and 20% excess, and most preferably about 10% excess, of azide above the stoichiometric amount required for the azidation reaction.

Not to be bound by theory, the reaction of the present invention is believed to involve the simultaneous chain cleavage and azidation of the high molecular weight PECH and/or PEEC by alkali metal azide and elevated temperatures (e.g. above 70° C., and preferably between 70° C. and 130° C.). The "degradation", or more specifically, the PECH or PEEC chain cleavage, occurs at an oxygen bonds and yields long chains of GAP polymers or copolymers, respectively. Some chains of GAP polymers or copolymers thus formed are grafted to the "degraded" rubbery matrix, and/or the polyol present (and thus incorporate the polyol structure into the GAP product). The final structure, thus obtained, has a branched structure which contains residual PECH and/or PEEC portions, polyol, and azide components, and generally has terminal hydroxyl groups.

It is to be appreciated that the molecular weight of the GAP material produced is less than the initial PECH or PEEC molecular weight, because the material has undergone "degradation" as the reaction proceeds. However, the molecular weight of the GAP material can be controllably varied by the selection of appropriate polyols and reaction conditions.

When conducting the process of the present invention, it is preferred that the reaction mixture be agitated. The reaction is generally conducted over a period of between 5 and 32 hours.

After the reaction has been completed, the solid salts (e.g. sodium chloride and/or residual sodium azide) may be removed by filtering and much of the solvent may be removed by evaporation at reduced pressure. A suitable organic solvent such as methylene chloride is then added to the reaction mixture followed by water washes to remove the remaining azide, solvent, polyol, cleaving agent and the like. Additional extractions are further conducted using a brine solution.

Preferably, the washing step is followed by a purification step which involves drying the methylene chloride solution over magnesium sulfate, and passing the solution through a column containing silica gel and activated carbon. The volatile solvent is stripped off by evaporation.

The present invention provides GAP polymers and GAP copolymers which incorporate polyol structures previously undisclosed. Accordingly, the present invention also provides branched chain hydroxy-terminated aliphatic azido ether polymers and copolymers which have been prepared in accordance with the process of the present invention, as described hereinabove, and which comprises the azidized residues of a solid rubbery epichlorohydrin polymer (PECH) or an epichlorohydrin/alkylene oxide (PEEC) copolymer, or a mixture of PECH and PEEC, preferably of a molecular weight of $0.50 \times 10^6$ to $5.0 \times 10^6$, and an alkali metal azide.

More preferably, however, the present invention provides branched chain hydroxy-terminated aliphatic azido ether polymers and copolymers which have been prepared in accordance with the process of the present invention, as described hereinabove, and which comprises the azidized residues of a solid rubbery epichlorohydrin polymer (PECH) or an epichlorohydrin/alkylene oxide (PEEC) copolymer, or a mixture of PECH and PEEC, preferably of a molecular weight of $0.50 \times 10^6$ to $5.0 \times 10^6$, an alkali metal azide, and a polyol other than ethylene glycol or glycerol.

EXAMPLES

The process and products of the present invention will now be further described and exemplified in the following experiments.

Example 1

A series of experiments were conducted using a system comprising a rubbery PECH, PEEC or a mixture of PECH and PEEC, an alkali metal azide (e.g. sodium azide), a polyol and a basic cleaving agent.

It should be noted that if a rubbery PECH is used as the starting material, the product will be a GAP homopolymer. If the reactant rubber is PEEC (e.g. 70% PECH with 30% ethylene oxide (EO)), or a mixture of PECH and PEEC, then the product will be a GAP-Ethylene Oxide copolymer (GEC). Where a mixture of PECH and PEEC are utilized, the weight percentage of GAP in the copolymer will vary within the range of 70 to 100%, for a PEEC having 30% EO, depending on the ratio of PECH to PEEC used in the reaction mixture.

In this series of experiments, it is believed that the "degradation" of the rubbery material is accomplished by the combined actions of the cleaving agent, the polyol, the azide and by the elevated temperatures used. The scission occurs at the oxygen bonds and produces polymeric chains which are then grafted on to the degraded rubbery matrix, and produce a branched structure with terminal hydroxyl groups.

The results of this series of experiments, using either a PECH rubbery material or a mixture of PECH and PEEC, are set out in Table 1, along with an indication of the polyol, azide, solvent and cleaving agent used, and their respective amounts. An analysis of the azido product is also included.

A typical procedure used for the experimental results presented in Table 1 is as follows:

Ten grams of a commercial rubbery PECH sample having a molecular weight of 750,000 was mixed in 50 grams of dimethyl sulfoxide (DMSO) for a period of about 1 hour at 120° C., in order to dissolve the PECH. Trimethylol propane (TMP), 2.5 grams, and sodium azide (8 grams) were then added to the mixture. The weight ratio of azide to PECH was about 0.80. After approximately 15 minutes, lithium methoxide (0.30 grams) was added, and the degradation/azidation reaction was allowed to proceed with agitation at 120° C. After 5 hours, heating and agitation of the reaction mixture were discontinued, and the reaction mixture was allowed to cool. The solid salts of formed NaCl and unreacted sodium azide were filtered from the mixture, and most of the DMSO solvent was removed by heating under vacuum at 50° C. The product was recovered by the remaining DMSO solution by a water precipitation technique, wherein about 2 liters of water was gradually added to the DMSO solution until a slight turbidity develops and polymer precipitation occurs. The solution is stirred slowly during the water addition. The precipitation material is then allowed to settle and the supernatant aqueous phase is removed. The aqueous phase contains water, DMSO, TMP and salts. The water addition procedure was repeated three times followed by evaporation under vacuum to recover 8.5 grams of GAP material.

The GAP material produced had a light yellow colour with a viscosity of about 30,000 cP at 25° C. The molecular weight was about 15,000, and the hydroxyl functionality (f) was about 4.8. The product had a glass transition temperature (Tg) of about −50° C.

Elemental analysis of the polymer as well as FTIR and NMR spectroscopy confirmed that: i) quantitative conversion of PECH to GAP was achieved; ii) no free TMP was present in the polymer which is an indication that the unreacted TMP was completely removed from the product by the purification procedure; and iii) a portion of the TMP reactant was grafted in to the GAP molecular structure and represented about 19% of the hydroxyl groups present in the product.

For the reaction mixture comprising PEEC, a branched GEC was prepared according to the same procedure described hereinabove, except that a commercial rubbery epichlorohydrin-ethylene oxide copolymer (PEEC), having a molecular weight of about 520,000, was used in place of PECH as the starting material. The reactant copolymer contained about 70%, by weight, PECH and 30% ethylene oxide. For this reason, a weight ratio of azide to PEEC of about 0.55 was used. The copolymer produced contained about 73%, by weight, of GAP and about 27% ethylene oxide, and had a molecular weight of about 12,000. The product had a Tg of about −55° C., a viscosity of about 55,000 cP at 25° C., and a functionality of about 3.0.

TABLE 1

Effect of Polyols on the Properties of some Azido Polyethers and Copolyethers obtained after 16 h at 120° C. using different solvents and cleaving agents

| Reactant Rubber | Reaction Solvent | Polyol | $\left(\dfrac{\text{Polyol}}{\text{Rubber}}\right)$ | Cleaving Agent | $\dfrac{\text{Cleaving agent}}{\text{Rubber}}$ | AZIDO PRODUCT | | | | |
|---|---|---|---|---|---|---|---|---|---|---|
| | | | | | | Type | MW | Viscosity at 25° C. (cP) | f | Tg °C. |
| PECH | DNA | TMP | 0.25 | NaOH | 0.045 | GAP | 19,000 | 42,000 | 4.1 | −50 |
| | | PEG (MW 600) | 0.50 | " | | | 22,000 | 66,000 | 4.6 | −50 |
| | | Hexanetriol | 0.50 | " | | | 30,000 | 82,000 | 5.6 | −50 |
| | | TMP | 0.25 | CH$_3$OLi | 0.042 | GAP | 11,000 | 34,000 | 3.5 | −55 |
| | | PEG (MW 400) | " | " | | | 14,000 | 40,000 | 3.9 | −50 |
| | | Hexanetriol | " | " | | | 21,000 | 57,000 | 4.4 | −50 |
| | DMSO | TMP | 0.15 | CH$_3$OLi | 0.02 | GAP | 17,000 | 40,000 | 4.6 | −50 |
| | | TMP | 0.025 | | 0.02 | | 24,000 | 50,000 | 4.6 | −50 |
| | | PE | 0.25 | | 0.03 | | 8500 | 28,000 | 3.4 | −55 |
| | | PE | 0.025 | | 0.03 | | 11,000 | 41,000 | 3.4 | −55 |

TABLE 1-continued

Effect of Polyols on the Properties of some Azido Polyethers and Copolyethers obtained after 16 h at 120° C. using different solvents and cleaving agents

| Reactant Rubber | Reaction Solvent | Polyol | (Polyol/Rubber) | Cleaving Agent | Cleaving agent/Rubber | AZIDO PRODUCT | | | | |
|---|---|---|---|---|---|---|---|---|---|---|
| | | | | | | Type | MW | Viscosity at 25° C. (cP) | f | Tg °C. |
| | | PEG (MW 600) | 0.50 | | 0.03 | | 20,000 | 69,000 | 4.1 | −50 |
| | | TMP (60%)-PEG 600 (40%) | 0.25 | | 0.03 | | 13,000 | 39,000 | 4.2 | −50 |
| | | PE (60%)-Hexanetriol (40%) | 0.25 | | 0.03 | | 14,000 | 38,000 | 4.0 | −50 |
| | | Hexanetriol | 0.25 | | 0.03 | | 12,000 | 32,000 | 4.0 | −55 |
| PECH-PEEC 70%   30% | DMSO | Hexanetriol | 0.25 | CH$_3$OLi | 0.03 | GEC GAP-EO 91% 9% | 14,000 | 50,000 | 3.8 | −55 |

Example 2

A further series of experiments was conducted in accordance with the procedure described in Example 1 but the level of cleaving agent was studied. In this series, the level of lithium methoxide was varied and the effect on the final GAP or GEC properties was noted. The results from this series of experiments are presented in Table 2, and demonstrate that increasing the level of cleaving agent results in lower molecular weights, lower functionality, and lower viscosities, for a given set of reaction conditions.

Example 3

A further series of experiments was conducted generally following the procedure outlined in Example 1. However, reaction systems with and without polyol were compared. Thus, only the rubbery PECH, PEEC or PECH/PEEC mixture, the alkali metal azide and the basic cleaving agent were included in one set of reaction. The properties of the products prepared for systems with and without basic cleaving agent are shown in Tables 3 and 4. A sample product prepared was compared to the product of a similar reaction system which also included IMP as a polyol. The results from the comparison are shown in Table 5. For those products wherein polyol was not included as part of the reaction mixture, the azido products obtained were different from those prepared according to Example 1 in terms of inter alia, hydroxyl functionality, distribution of hydroxyl functionality, or hydroxyl type (primary or secondary).

TABLE 3

Properties of some Azido Polymers and Copolymers (prepared in DMSO at 120° C. for 16 Hours without Polyol or Cleaving Agent)

| Azido Product | MW | f | Viscosity (25° C.) cP | Tg °C. |
|---|---|---|---|---|
| GAP | 110,000 | 14.0 | 1.5 × 10$^6$ | −45 |
| GEC 70% GAP-30% EO | 115,000 | 13.0 | 9.0 × 10$^6$ | −55 |

TABLE 4

Properties of some Azido Polymers and Copolymers (prepared in DMSO at 120° C. for 16 hours without Polyol)

| Azido Product | CH$_3$OLi/Rubber | MW | f | Viscosity (25° C.) cP | Tg °C. |
|---|---|---|---|---|---|
| GAP | 0.015 | 30,000 | 4.5 | 104,000 | −50 |
| | 0.030 | 14,000 | 3.2 | 54,000 | −50 |
| | 0.040 | 8300 | 3.0 | 45,000 | −55 |
| GEC (GAP-EO) 70%   30% | 0.030 | 29,000 | 4.4 | 146,000 | −55 |
| | 0.040 | 17,000 | 2.5 | 90,000 | −55 |

TABLE 2

Effect of Cleaving Agent Concentration using Lithium Methoxide (in DMSO at 120° C. for 5 hours with TMP as polyol)

| Reactant Rubber | CH$_3$OLi/Rubber | TMP/Rubber | AZIDO PRODUCT | | | | |
|---|---|---|---|---|---|---|---|
| | | | Type | MW | f | Viscosity (25° C.) cP | Tg °C. |
| PECH | 0.0125 | 0.25 | GAP | 32,000 | 5.5 | 83,000 | −50 |
| | 0.020 | " | | 22,000 | 5.0 | 45,000 | −50 |
| | 0.030 | " | | 15,000 | 4.8 | 30,000 | −50 |
| PEEC (PECH-EO) 70%   30% | 0.015 | 0.25 | GEC (GAP-EO) 70%   30% | 36,000 | 4.3 | 300,000 | −55 |
| | 0.030 | " | | 20,000 | 3.5 | 80,000 | −55 |
| | 0.040 | " | | 12,000 | 3.0 | 55,000 | −55 |

TABLE 5

Comparison of GAP Products (Prepared in DMSO at 120° C. for 16 hours with CH$_3$OLi/PECH = 0.030)

| Property | Method 1 (with TMP Polyol) | Method 2 (without Polyol) |
|---|---|---|
| Average OH functionality | 5.0 | 3.2 |
| OH Equivalent Weight | 1360 | 1810 |
| OH functionality distribution | | |
| below 3.5 | 0 | 68 |
| 3.5–4.5 | 40 | 17 |
| 4.5–5.5 | 43 | 10 |
| above 5.5 | 17 | 5 |
| % OH in GAP originating from TMP | 19 | 0 |
| Molar % alcohol relative to GAP | | |
| primary OH | 3.3 | 2.5 |
| secondary OH | 5.0 | 3.0 |

Example 4

A series of experiments in accordance with the present invention, and generally in accordance with the procedure described in Example 1, were conducted wherein the basic cleaving agent was omitted. Thus, the reaction system comprised a rubbery PECH, PEEC or a mixture of PECH and PEEC, an alkali metal azide, and a polyol. The results of this series of experiments are presented in Table 6.

For this procedure, the GAP was prepared according to the same procedure as described in Example 1 except that no basic cleaving agent was added. Specifically, a typical reaction according to this example was conducted for 16 hours at 120° C. with 10 grams PECH (molecular weight 750,000) in 50 grams DMSO and 2.5 grams pentaerythritol with 8.0 grams of sodium azide. About 8.5 grams of product was collected which had a molecular weight of about 89,000, a Tg of about −50° C., a viscosity of about 690,000 cP at 25° C., and a hydroxyl functionality of about 10.

Having described specific embodiments of the present invention, it will be understood that modifications thereof may be suggested to those skilled in the art, and it is intended to cover all such modifications as fall within the scope of the appended claims.

TABLE 6

Properties of some Branched Azido Polyethers and Copolyethers prepared in DMSO using different Polyols but without cleaving agent

| Starting Material | | Reaction | | | AZIDO PRODUCT | | | | |
|---|---|---|---|---|---|---|---|---|---|
| Reactant Rubber | MW | T °C. | time (h) | Polyol* | Type | MW | f | Viscosity (25° C.) cP | Tg °C. |
| PECH Homopolymer | 7.5 × 10$^5$ | 120 | 16 | PE | GAP Homopolymer | 89,000 | 10 | 6.9 × 10$^5$ | −50 |
| | | 120 | 16 | TMP | | 100,000 | 12 | 7.8 × 10$^5$ | −45 |
| | | 100 | 32 | TMP | | 165,000 | 14 | very viscous | −45 |
| PEEC (PECH-EO) Copolymer 70%-30% | 5.2 × 10$^5$ | 120 | 5 | TMP | GEC (GAP-EO) Copolymer 70%-30% | 98,000 | 10 | 2.5 × 10$^6$ | −55 |
| | | 100 | 32 | TMP | | 185,000 | 14 | very viscous | −50 |

*The weight ratio (Polyol/Rubber) is 0.25

The embodiments of the invention in which an exclusive property or privilege is claimed are defined as follows:

1. A process for the preparation of branched chain hydroxy-terminated aliphatic azido ether polymers and copolymers comprising heating a reaction mixture consisting of:
   i) an epichlorohydrin polymer (PECH) or an epichlorohydrin/alkylene oxide (PEEC) copolymer, or a mixture of PECH and PEEC wherein the PECH or PEEC has a molecular weight of between 0.50×10$^6$ to 5.0×10$^6$;
   ii) an alkali metal azide, in a suitable organic solvent; and
   iii) optionally a basic cleaving agent, at a temperature of greater than 70° C., to thereby affect degradation and azidation of said PECH polymer or PEEC copolymer.

2. A process as claimed in claim 1 additionally comprising a basic cleaving agent.

3. A process for the preparation of branched chain hydroxy-terminated aliphatic azido ether polymers and copolymers comprising reacting:
   i) an epichlorohydrin polymer (PECH) or an epichlorohydrin/alkylene oxide (PEEC) copolymer, or a mixture of PECH and PEEC wherein the PECH or PEEC has a molecular weight of between 0.50×10$^6$ to 5.0×10$^6$;
   ii) an alkali metal azide;
   iii) optionally a basic cleaving agent; and
   iv) at least one polyol selected from the group consisting of hexanetriol, trimethylol propane, trimethylolethane, pentaerythritol, dipentaerythritol, sucrose, polyethylene glycol, polypropylene glycol, polytetrahydrofuran, a polycaprolactone, a polyethyleneadipate, a polyoxetane and a polyvinyl alcohol, said polyol being incorporated into the azido ether polymer, in a suitable organic solvent, at a temperature of greater than 70° C., to thereby affect degradation and azidation of said PECH polymer or PEEC copolymer.

4. A process as claimed in claim 3 additionally comprising a basic cleaving agent.

5. A process as claimed in any one of claims 1 to 4 wherein said solvent is dimethyl sulfoxide, dimethyl acetamide or dimethyl formamide, or mixtures thereof.

6. A process as claimed in any one of claims 1 to 4 wherein said azide is sodium azide, potassium azide or lithium azide.

7. A process as claimed in any one of claims 1 or 3 wherein said branched chain hydroxy-terminated aliphatic azido ether polymer and copolymer has a hydroxyl functionality greater than 10.

8. A process as claimed in any one of claims 1 to 4 wherein said reaction comprises a mixture of PEEC and PECH.

9. A process as claimed in any one of claims 1 to 4 wherein the reaction temperature is between 70° C. and 130° C.

10. A process as claimed in any one of claims 1 to 4 wherein the reactants are heated for a period of from 5 to 32 hours.

11. A process as claimed in claim 3 wherein said polyol is hexanetriol, trimethylol propane, trimethylolethane, pentaerythritol, dipentaerythritol, or sucrose, or a mixture thereof.

12. A process as claimed in claim 11 wherein said polyol is hexanetriol, trimethylol propane, trimethylolethane or pentaerythritol, or a mixture thereof.

13. A process as claimed in claim 3 wherein said polyol is polyethylene glycol, polypropylene glycol, polytetrahydrofuran, a polycaprolactone, a polyethyleneadipate, a polyoxetane or a polyvinyl alcohol, or a mixture thereof.

14. A process as claimed in claim 13 wherein said polyol is polyethylene glycol, polypropylene glycol, polytetrahydrofuran, a polycaprolactone or polyethyleneadipate, or a mixture thereof.

15. A process as claimed in claims 2 or 4 wherein said basic cleaving agent is lithium methoxide, sodium methoxide, sodium ethoxide, potassium tert-butoxide, sodium hydroxide or potassium hydroxide.

16. Branched chain hydroxy-terminated aliphatic azido ether polymers and copolymers which have been prepared by a process conducted in accordance with claim 1, and which comprises the azidized residues of epichlorohydrin polymer (PEEC) copolymer, or a mixture of PECH and PEEC, and an alkali metal azide.

17. Branched chain hydroxy-terminated aliphatic azido ether polymers and copolymers which have been prepared by a process conducted in accordance with claim 2, and which comprises the azidized residues of epichlorohydrin polymer (PECH) or an epichlorohydrin/alkylene oxide (PEEC) copolymer, or a mixture of PECH and PEEC, and an alkali metal azide.

18. Branched chain hydroxy-terminated aliphatic azido ether polymers and copolymers which have been prepared by a process conducted in accordance with claim 3, and which comprises the azidized residue of epichlorohydrin polymer (PECH) or an epichlorohydrin/alkylene oxide (PEEC) copolymer, or a mixture of PECH or PEEC, an alkali metal azide, and said polyol.

19. Branched chain hydroxy-terminated aliphatic azido ether polymers and copolymers which have been prepared by a process conducted in accordance with claim 4, and which comprises the azidized residues of epichlorohydrin polymer (PECH) or an epichlorohydrin/alkylene oxide (PEEC) copolymer, or a mixture of PECH and PEEC, an alkali metal azide, and said polyol.

20. Branched chain hydroxy-terminated aliphatic azido ether polymers and copolymers as claimed in any one of claims 16 to 19 wherein said alkali metal azide is sodium azide, potassium azide or lithium azide.

21. Branched chain hydroxy-terminated aliphatic azido ether polymers and copolymers as claimed in claim 19 wherein said polyol is hexanetriol, trimethylol propane, trimethylolethane, pentaerythritol, dipentaerythritol, or sucrose, or a mixture thereof.

22. Branched chain hydroxy-terminated aliphatic azido ether polymers and copolymers as claimed in claim 21 wherein said polyol is hexanetriol, trimethylol propane, trimethylolethane or pentaerythritol, or a mixture thereof.

23. Branched chain hydroxy-terminated aliphatic azido ether polymers and copolymers as claimed in claim 19 wherein said polyol is polyethylene glycol, polypropylene glycol, polytetrahydrofuran, a polycaprolactone, a polyethyladipate or polyvinyl alcohol, or a mixture thereof.

24. Branched chain hydroxy-terminated aliphatic azido ether polymers and copolymers as claimed in claim 23 wherein said polyol is polyethylene glycol, polypropylene glycol, polytetrahydrofuran, a polycaprolactone or polyethyladipate, or a mixture thereof.

* * * * *